(12) United States Patent
Barrett et al.

(10) Patent No.: US 8,538,866 B2
(45) Date of Patent: Sep. 17, 2013

(54) SYSTEM AND METHOD FOR PROCESSING BANKRUPTCY CLAIMS

(75) Inventors: Melyssa Barrett, Tracy, CA (US); Eric Christopher Lundquist, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1312 days.

(21) Appl. No.: 11/613,859

(22) Filed: Dec. 20, 2006

(65) Prior Publication Data

US 2007/0299768 A1    Dec. 27, 2007

Related U.S. Application Data

(60) Provisional application No. 60/816,129, filed on Jun. 22, 2006, provisional application No. 60/818,261, filed on Jun. 29, 2006, provisional application No. 60/819,553, filed on Jul. 7, 2006.

(51) Int. Cl.
   *G06Q 40/00* (2012.01)
(52) U.S. Cl.
   USPC .................................. 705/38; 705/39
(58) Field of Classification Search
   USPC ......................................... 705/38, 39
   See application file for complete search history.

(56) References Cited

U.S. PATENT DOCUMENTS

| | | | |
|---|---|---|---|
| 6,513,019 B2* | 1/2003 | Lewis | 705/35 |
| 6,961,902 B2* | 11/2005 | Anecki et al. | 715/222 |
| 7,055,165 B2* | 5/2006 | Connelly | 725/9 |
| 7,117,171 B1* | 10/2006 | Pollin et al. | 705/35 |
| 2002/0019741 A1* | 2/2002 | Heston | 705/1 |
| 2002/0198824 A1* | 12/2002 | Cook | 705/38 |
| 2003/0028477 A1* | 2/2003 | Stevenson et al. | 705/38 |
| 2003/0079177 A1 | 4/2003 | Brintzenhofe et al. | |
| 2003/0083916 A1* | 5/2003 | Tracey et al. | 705/7 |
| 2003/0120587 A1* | 6/2003 | Hargrave et al. | 705/38 |
| 2004/0002915 A1* | 1/2004 | McDonald et al. | 705/38 |
| 2004/0019560 A1* | 1/2004 | Evans et al. | 705/40 |
| 2004/0064404 A1* | 4/2004 | Cohen et al. | 705/38 |
| 2004/0230510 A1* | 11/2004 | Tyson-Quah | 705/35 |

OTHER PUBLICATIONS

Proof of Claim (Form B10) Software from dodownload.com (http://www.dodownload.com/business+manage/tax/proof+of+claim+form+b10+software.h . . . ) ; printed on Aug. 18, 2010), 2 pages.

* cited by examiner

*Primary Examiner* — Thomas Dixon
*Assistant Examiner* — Gerald Vizvary
(74) *Attorney, Agent, or Firm* — Kilpatrick Townsend Stockton LLP

(57) ABSTRACT

A method is disclosed. The method includes sending bankruptcy notification messages to a plurality of creditors. The bankruptcy notification messages notify the creditors that various debtors have filed for bankruptcy. Requests are received from the plurality of creditors to file proofs of claims for debts owed by the debtors to the creditors with bankruptcy organizations. The requests are aggregated from the plurality of creditors, and the proofs of claims are filed with the bankruptcy organizations.

13 Claims, 22 Drawing Sheets

| Field | Description |
|---|---|
| Unique Identifier | Example: ABC000000099801 0098F<br>Position 1-3: Uniquely identifies system user<br>Positions 4-13: Assigned by Member to uniquely identify claim<br>Position 14: F, A, or W (File, Amend, or Withdraw)<br>Position 15-16: Sequence Number |
| Transaction Type | Add, Delete, Hold, Release |
| Filing Action | File, Amend, Withdraw |
| Court Number | Court where claim is to be filed |
| B-10 Fields (Case Number, Claim Amount, etc.) | Fields necessary to automatically generate the B-10 form |
| Automatically Generate B-10 | Y=system will generate B-10 form, N=Bank will generate and forward B-10 form to system |
| Automatically Generate Back-up Document | Y= system will generate unsecured back-up documentation, N=Member will generate unsecured back-up documentation and forward to system |
| Hold Expire Date | Date on which HOLD flag will expire |
| Release Filing Without Back-up Documents | Y= system will release the claim filing without back-up documentation, N= system will release claim filing after back-up documentation has arrived |
| Back-up Document Fields | Fields necessary to automatically generate the unsecured back-up documentation |

Page 1 of 1

Member Bank
Daily Summary Report

Proof of Claim Records Received From User

Number of Records Received: 50
Number of Records Accepted: 49
Number of Records Rejected: 1

Documentation Files Received From User

Number of Documents Received: 79
Number of Documents Accepted: 77
Number of Documents Rejected: 2

Proof of Claims Filed at Bankruptcy Courts

Number of Proof of Claims Ready to Process: 56
Number of Proof of Claims Filed: 52
Number of Withdrawals Filed: 1
Number of Amendments Filed: 2
Number of Claims Unable to Process: 1

For questions regarding information on this report, please call the Help Desk: nnn-nnn-nnnn or email xxxxxx@xxxxxxx.com

Member Bank
Proof of Claim Validation Report
For Files Received on November 12, 2004

Page 1 of 1

Filename: XXXX_041112_01.txt
DateTime Processed: November 12, 2004 7:10 PM PDT
Job Reference Number: mmm

Number of Records Received: 50
Number of Records Accepted: 49
Number of Records Rejected: 1

Reject Detail:

| Unique ID | Offending Field | Field Value | Reason Rejected |
|---|---|---|---|
| XXXX0000000012F00 | Court Number | xxx | Invalid Court Number |
| XXXX0000000012F01 | Claim Amount | 00.00 | Must be greater than $0 |

For questions regarding information on this report, please call the Help Desk: xxx-xxx-xxxx or email xxxx@xxxxxxx.com

Page 1 of 1

Member Bank
Documentation Validation Report
For Files Received on November 12, 2004

DateTime Processed:  November 12, 2004 7:20 PM PDT
Job Reference Number:  nnn

Number of Documents Received:  79
Number of Documents Accepted:  77
Number of Documents Rejected:  2

Reject Detail:

| Document Name | Reason Rejected |
|---|---|
| XXX000000019F00_Att_DeedofTrust.pdf | No matching POC on file |
| XXX123.pdf | Non-conforming filename |

For questions regarding information on this report, please call the Help Desk: xxx-xxx-xxxx or email xxxx@xxxxxxx.com

Member Bank
Filing Activity Report, Filing Detail
For POCs Ready on November 12, 2004

| UniqueID | District | Case | Claim | Amount | File Date Time | Case Stamp | Document Submitted | Doc Stamp | Batch # |
|---|---|---|---|---|---|---|---|---|---|
| XXX000000000001F00 | TX-Northern | 04-07312 | 3 | $450.00 | 11/12/2004 12:47 PM PDT | 875559772 | XXX000000000001F00_POC.pdf<br>XXX000000000001F00_Att_Statement.pdf | 116314-1<br>116314-2 | 5555 |
| XXX000000000002F00 | TX-Northern | 04-07670 | 10 | $5,010.00 | 11/12/2004 12:49 PM PDT | 875559773 | XXX000000000001F00_POC.pdf<br>XXX000000000001F00_Att_Statement.pdf<br>XXX000000000001F00_Att_Application.pdf | 116315-1<br>116315-2<br>116315-3 | 5555 |
| XXX000000000002W00 | AL-Southern | 04-89001 | 10 | $100.00 | 11/12/2004 12:55 PM PDT | 8909k9d00 | XXX000000000001F00_Att_Withdrawal.pdf | 178900-A | 5556 |

For questions regarding information on this report, please call the Help Desk: xxx-xxx-xxxx or email xxxx@xxxxxxx.com

FIG. 9

| Field | Description |
|---|---|
| Unique Identifier | XXX0000000001F00 |
| Filing Status | Filed or problem |
| Date Time Filed | Date time claim filed at court |
| Court Stamp ID | Stamp assigned by court at time of filing |
| District Court | Court where claim filed |
| Case Number | Case number against which claim was filed |
| Claim Number | Claim number assigned by court |
| Debt Type | Secured, unsecured, priority |
| Claim Amount | Amount for which claim was submitted |
| Account Number | Account number on claim |

Member Bank
Aging Report

| Date Posted | Unique ID | Documentation Posted | Status | Hold Expire Date | Comments |
|---|---|---|---|---|---|
| 12/03/05 | XXX000000000101F00 | XXX000000000101F00_POC.pdf | Waiting | | Waiting for back-up documentation. |
| 12/05/05 | XXX000000000121F00 | XXX000000000121F00_POC.pdf | Hold | 12/25/04 | |
| 12/12/05 | XXX00000000003F00 | XXX00000000003F00_POC.pdf | Ready | | Unable to file due to technical problem at court. Will attempt to file in next run. |

For questions regarding information on this report, please call the Help Desk: xxx-xxx-xxxx or email xxxx@xxxxxx.com

FIG. 11

Batch Track Report
For December 2004

| Date | Batch # | POCs Submitted | Filed | Amended | Withdrawn | Deleted | Pending |
|---|---|---|---|---|---|---|---|
| Dec 01 | XXX_041201_01 | 10 | 10 | 0 | 0 | 0 | 0 |
| Dec 02 | XXX_041202_01 | 6 | 5 | 0 | 0 | 1 | 0 |
| Dec 02 | XXX_041202_02 | 6 | 6 | 0 | 0 | 0 | 0 |
| Dec 03 | XXX_041203_01 | 4 | 3 | 0 | 1 | 0 | 0 |
| Dec 04 | XXX_041204_01 | 10 | 8 | 2 | 0 | 0 | 0 |
| Dec 05 | XXX_041205_01 | 12 | 10 | 1 | 0 | 1 | 0 |
| Dec 05 | XXX_041205_02 | 15 | 12 | 2 | 1 | 0 | 0 |
| Dec 06 | XXX_041206_01 | 31 | 25 | 2 | 2 | 2 | 0 |
| Dec 07 | XXX_041207_01 | 10 | 10 | 0 | 0 | 0 | 0 |
| Dec 08 | XXX_041208_01 | 11 | 10 | 0 | 0 | 0 | 1 |
| Dec 09 | XXX_041209_01 | 10 | 5 | 0 | 0 | 0 | 5 |
| Month-to-Date TOTAL | | 125 | 104 | 7 | 4 | 4 | 6 |

FIG. 12

Search POC

Search for POCs by specifying one or a combination of criteria. Fields in bold are required.

- ◉ Date POC Generated
- ○ Date POC Filed

From 2/10/2006    To 5/11/2006

Case Number: [          ]

Account Number: [          ]

POC Unique Id: [          ]

Batch Number: [          ]

Court Number: [Select ▼]

Court State: [Select State ▼]

Debtor Name: [          ]

Debtor SSN: [          ]

Debt Type:
- ☐ Secured Claim Amount   From: [     ]   To: [     ]
- ☐ Unsecured Claim Amount  From: [     ]   To: [     ]
- ☐ Priority Claim Amount   From: [     ]   To: [     ]

Collateral Type: ☐ Real Estate  ☑ Motor Vehicle  ☐ Other [          ]

Filing Action: [All ▼]
- All
- Original Filing
- Amendment
- Withdrawal

Record Status: [All ▼]
- All
- Waiting
- Filed
- Problem Outstanding

[ Search ]

FIG. 13

| POC Unique Id | Court | Case Number | Account Number (last 4 digits) | Filing Action | Filing Status | Status Date | Debtor1 | Debtor1 SSN (last 4 digits) | Debtor2 | Debtor2 SSN (last 4 digits) | Secured Claim Amt | Unsecured Claim Amt | Priority Claim Amt |
|---|---|---|---|---|---|---|---|---|---|---|---|---|---|
| XYZ0000000 | CAC1-Los Angeles | 04-15454 | 9489 | Original Filing | Waiting | 4/10/2006 | James Smith | 6272 | Jim Joseph | 6272 | 2222.90 | 2222.90 | 2222.90 |
| XYZ0000000 | FLM1-Ft Meyers | 04-11111 | 1111 | Amendment | Waiting | 4/10/2006 | Michael Armstrong | 2345 | Jim Joseph | 6272 | 546.67 | 546.67 | 546.67 |
| XYZ0000000 | FLS2-Miami | 04-23121 | 3456 | Withdrawl | Problem | 4/10/2006 | Melanie Gonzales | 6272 | Joe Smith | 4273 | 7070.45 | 7070.45 | 7070.45 |
| XYZ0000000 | FLS2-Miami | 01-23121 | 2999 | Amendment | Filed | 4/10/2006 | Melanie Jones | 6272 | Murali Ho | 5000 | 100000.00 | 100000.00 | 100000.00 |
| XYZ0000000 | FLS2-Miami | 04-77777 | 1334 | Original Filing | Filed | 4/10/2006 | Bill Rogers | 6272 | John James | 4273 | 1000.45 | 1000.45 | 1000.45 |

Back To Search

Enter a Unique ID for this POC: ☐

United States Bankruptcy Court: [Select ▼]

Case Number: ☐

| | | |
|---|---|---|
| Debtor 1 Name: ☐ | Social Security #: ☐ | |
| | Confirm SSN1: ☐ | |
| Debtor 2 Name: ☐ | Social Security #: ☐ | |
| | Confirm SSN2: ☐ | |

Bankruptcy Chapter: [013 ▼]

Name of Creditor:
XYZ Bank

☐ Check box if you are aware that anyone else has filed a proof of claim relating to your claim. Attach copy of statement giving particulars.

☐ Check box if you have never received any notices from the bankruptcy court in this case.

☐ Check box if the address differs from the address on the envelope sent to you by the court.

Name and address where notices should be sent:

Address Line 1: XYZ Bank
Address Line 2: 123 Avalon Dr.
Address Line 3: Los Angeles CA 98765
Address Line 4: ☐
Address Line 5: ☐
Telephone Number: 555-878-9876

Account or other number by which creditor identifies debtor: ☐

FIG. 15B

1. Basis for Claim:
☐ Goods sold
☐ Services performed
☑ Money loaned
☐ Personal Injury/wrongful death
☐ Taxes
☐ Retiree benefits as defined in 11 U.S.C. S1114(a)

2. Date debt was incurred: [mm/dd/yy]    3. If court judgment, date obtained: [mm/dd/yy]

4. Total Amount of Claim at Time Case Filed:
The total amount of claim will be automatically calculated based on your input in Items 5,6, and 7 below.

☐ Check this box if claim includes interest or other charges in addition to the principal amount of the claim. Attach itemized statement of all interest or additional charges.

5. Secured Claim.
Fill in this amount if your claim is secured by collateral (including a right of setoff.

Secured claim amount: [         ]

Brief Description of Collateral:
☐ Real Estate  ☐ Motor Vehicle  ☐ Other
                                        Value of Collateral: [         ]

Amount of arrearage and other charges at
time case filed included in security claim if
any: [         ]

6. Unsecured Nonpriority Claim
Fill in this amount if: a) there is no collateral or lien securing your claim, or b) your claim exceeds the value of the property securing it, or if c) none or only part of your claim is entitled to priority.

Unsecured claim amount: [         ]

7. Unsecured Priority Claim.
Fill in this amount if you have unsecured priority claim.

Amount entitled to priority: [          ]

Specify the priority of the claim:

○ Wages, salaries or commissions (up to $4,920)* earned within 90 days before filing of the bankruptcy petition or cessation of the debtor's business, whichever is earlier - 11 U.S.C § 507(a)(3)
○ Contributions to an employee benefit plan - 11 U.S.C. 507(a)(4).
○ Up to $2,225* of deposits toward purchase, lease, or rental of property, or services for personal, family, or household use. 11 U.S.C. S 507(a)(6).
○ Alimony, maintenance, or support toward a spouse, former spouse, or child - 11 U.S.C. S 507(a)(7).
○ Taxes or penalties owed to governmental units - 11 U.S.C. S 507(a)(8).
○ Other - Specify applicable paragraph of 11 U.S.C. 507a-[     ]

8. Credits: The amount of all payments on this claim has been creditited and deducted for the purpose of making this proof of claim.

_____

⦿ Release POC for filing upon submittal
○ Do not file this POC until:    [ mm/dd/yy ]
☐ Release filing without backup documentation In most cases, courts require backup documentation.

_____

☐ Check this box if this claim is being filed late.
☐ Check this box if this is an installment loan.

_____

Date:
Sign and print the name and title, if any, of the creditor or other person authorized to file this claim (attach copy of power of attorney, if any):     /s/   [          ]

After you click Save, you will be taken to a page that will allow you to attach backup documentation, unless the "Release filing without backup documentation" checkbox is selected.

[ Save ]

FIG. 15C

Court Requirements

- Promissory Notes
- Court Judgement
- Contracts
- Invoice Orders

Documentation Management for POC: XYZ_000000101010101F

Supporting Documents: Attach copies of supporting documents, such as promissory notes, purchase orders, invoices, itemized statements of running accounts, contracts, court judgments, mortgages, security agreements and evidence of perfection of lien. DO NOT SEND ORIGINAL DOCUMENTS. If the documents are not available, explain. If the documents are voluminous, attach a summary.

Promissory Notes | Delete
Contract | Delete

Upload Backup Documentation: [_____] [ Browse... ] [ Upload ]

Back to Edit

FIG. 16

File Management

Use this page to upload POC batch files and/or supporting documentation batch files or to download other files.

1. Upload POC Batch Files

Proof of Claim batch secifications:

1. Filename conventions:
   - POC Batch File: UserIdentifier_CCYYMMDD_SequenceNumber.txt (ex: XYZ_20040311_1.txt)
   - Zip file name: UserIdentifier_CCYYMMDD_SequenceNumber.zip (ex: XYZ_20040311_1.zip)
2. File layout must conform to standard POC record layout.
3. Header record must be included and conform to specifications.
4. Trailer record must be included and conform to specifications.
5. File must be in .txt format and zipped.

Select POC batch file to upload: [_____] [Browse...]

[Upload Batch]

2. Upload Backup Documentation Batch Files

Before you upload backup documentation for a specific POC, that POC must already be in the File Proof system.

Backup documentation specifications:

1. Filename conventions:
   - Individual filename:UniqueIdentifier_Att_ContentType.pcf (ex: XYZ00000001010101F_Att_DeedOfTrust.pdf.)
   - Zip file name: UserIdentifier_CCYYMMDD_SequenceNumber_b.zip (ex: XYZ_20040311_1_b.zip)
2. File can be in .pdf or .doc format
3. Multiple documents can be forwarded in one file, but must belong to only one claim
4. Multiple documents can be associated with one claim.
5. File must be in zipped format.
   - Must not be larger than 1.5 M, unzipped
   - Must be in black and white
   - Must be 300 dpi
6. Replacement files can be sent to override a previously sent file. The replacement file should use the same filename as the file it is intended to overwrite.

Select backup documentation batch file to upload: [_____] [Browse...]

[Upload Batch]

Download Files

○ Transaction Return: From: [___] To: [___]
○ Completed B10: From: [___] To: [___]
○ Court Receipt: From: [___] To: [___]
○ Backup Document: From: [___] To: [___]

[Download]

FIG. 17

Reports

○ Summary: From ☐ To ☐

○ Proof of Claim Validation: From ☐ To ☐

○ Documentation validation: From ☐ To ☐

○ Filing Activity: From ☐ To ☐

○ Batch Track: From ☐ To ☐

○ Aging: From ☐ To ☐

○ Account Tracking: From ☐ To ☐

[Download]

FIG. 18

Search Creditor Version A

Name

Address

City    State    ZIP    search

Search Creditor Version B

Name

ZIP    Search

FIG. 20

SYSTEM AND METHOD FOR PROCESSING BANKRUPTCY CLAIMS

CROSS-REFERENCES TO RELATED APPLICATIONS

This application is a non-provisional of and claims priority to U.S. Provisional Patent Application No. 60/816,129, which was filed on Jun. 22, 2006, U.S. Provisional Patent Application No. 60/818,261, which was filed on Jun. 29, 2006, and U.S. Provisional Patent Application No. 60/819,553, filed on Jul. 7, 2006, which are which all herein incorporated by reference in their entirety for all purposes.

BACKGROUND

When a debtor files for a Chapter 13 bankruptcy in a bankruptcy court, the creditors associated with the debtor need to file proofs of claims (POCs) with the bankruptcy court in order to be included in the repayment plan under Chapter 13. Each court has its own electronic system for accepting the electronic filings of proofs of claims. This process is fairly simple for a creditor that needs to file a single proof of claim with a single bankruptcy court.

The proof of claim filing process is not that simple for a creditor with many proofs of claims to file. A large creditor such as a bank may be associated with a number of debtors. For example, an issuer bank may have a number of different debtors who have defaulted on loans made by the bank. These debtors may have filed for bankruptcy in the various bankruptcy courts around the country. In some cases, the bank may have to file proofs of claims in almost 100 different, separate court systems. This is a particularly burdensome and time consuming task. In addition, any information resulting from the filing of a proof of claim may not be systematically tracked for the bank, since it is likely that the filing systems for one or more court systems may not interface with the bank's computer system.

It would be desirable to allow creditors such as banks to systematically file proofs of claims in various bankruptcy courts and allow those banks to systematically track such filings. This will ultimately decrease the cost of bankruptcy processing to those creditors and will ultimately allow them to process more claims and recover more of their debts.

Another problem associated with filing many proofs of claims is that the various bankruptcy courts have filing systems that are not configured in the same way. This makes it difficult to do automatic mass proof of claim filings.

One way to address this is to create a computer program for each individual court. Each computer program would be specifically created and adapted to a particular court and allow for automatic filing. This option, however, is particularly time consuming. In addition, even if it could be done, courts often change the configurations of their filing systems, and such specialized computer programs would need to be consistently and manually updated each time a court decides to change the configuration of its filing system. This again is a laborious task that may be impractical in some cases.

Embodiments of the invention address the above problems, as well as other problems.

BRIEF SUMMARY

Embodiments of the invention are directed to bankruptcy claim processing systems and methods.

One embodiment of the invention is directed to a method comprising receiving requests and data records from a plurality of creditors to file bankruptcy documents with a plurality of different bankruptcy organizations, and automatically generating the bankruptcy documents with the received data records. The bankruptcy documents are suitable for filing with different bankruptcy organizations. The bankruptcy documents are batch filed with the different bankruptcy organizations. The different bankruptcy organizations may be bankruptcy courts.

In another embodiment of the invention, a server computer at a data processing organization may receive requests from a plurality of creditors to file proofs of claims for debts owed by debtors to the creditors with a plurality of different bankruptcy organizations. Each request can include data records for generating a proof of claim. Then, proofs of claims are automatically generated and formatted for filing with different bankruptcy organizations. The proofs of claims are then batch filed with different bankruptcy organizations along with any backup documentation that would support the proofs of claims.

Other embodiments of the invention are directed to computer readable media, servers, and data processing systems that are associated with the above-described methods as well as other methods disclosed herein.

BRIEF DESCRIPTION OF THE DRAWINGS

FIG. 5 is a POC input record text file.

FIG. 6 is a daily summary report of POC filings.

FIG. 7 is a POC validation report.

FIG. 8 is a backup documentation validation report.

FIG. 9 is a POC filing activity summary report.

FIG. 10 shows data fields for a return file, after a proof of claim has been filed.

FIG. 11 is a POC aging report.

FIG. 12 is a POC batch tracking report.

FIG. 13 is a POC search Web page.

FIG. 14 is a POC search result display.

FIG. 15A-15C are parts of a screenshot of a Web page, which allows a user to add a POC.

FIG. 16 is a backup documentation management web interface.

FIG. 17 is a batch file management web interface.

FIG. 18 is a report generation web interface.

FIG. 20 shows two document objects associated with a search creditor function.

DETAILED DESCRIPTION

Figure 1:
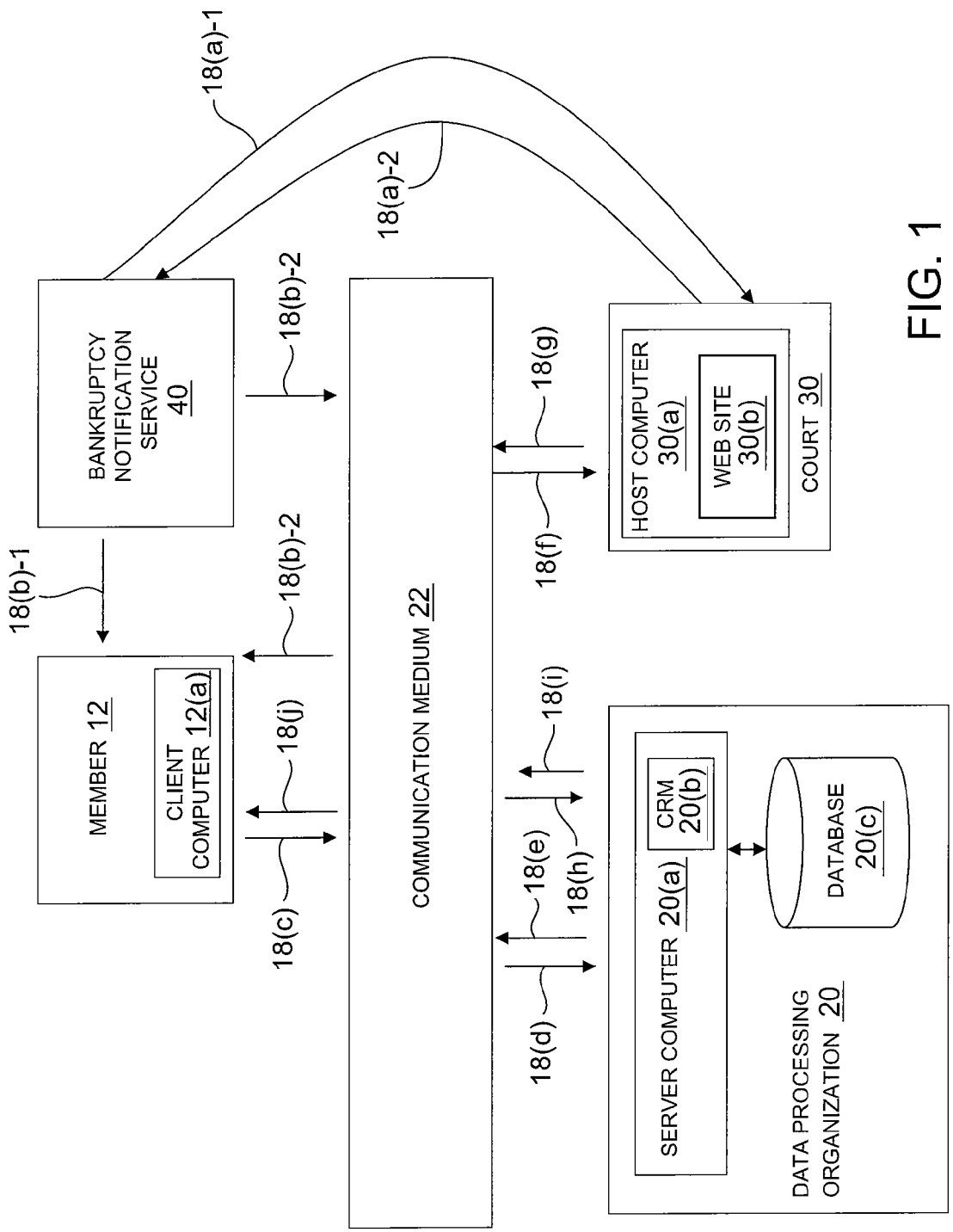
FIG. 1 is a block diagram showing components of a data processing system.

Some embodiments of the invention are directed to systems, methods, and computer readable media associated with proof of claim filings. Other embodiments of the invention are directed to systems, methods, and computer readable media for interacting with electronic documents such as Web pages. Yet other embodiments are directed to combinations thereof. Although the specific embodiments of the invention that are described below are described in the context of bankruptcy proceedings, it is understood that embodiments of the invention are not limited to the specific embodiments described. For example, the document interaction embodiments can be used with other types of courts, including other types of civil courts or even criminal courts, as well as administrative agencies (e.g., government agencies).

I. Proof of Claim Filings

Embodiments of the invention provide a single system and interface for a creditor (such as a financial institution) or other entity to interact with different courts having differently configured computer systems. Embodiments of the invention can accept proof of claim data and documentation from a creditor via a Web-based front end and/or through batch file transfers via an SFTP (secure file transfer protocol) connection or the like.

Embodiments of the invention can also interface with other systems such as bankruptcy information systems and bankruptcy evaluation systems (described in the above noted U.S. provisional patent applications) to collect bankruptcy data related to a pending bankruptcy proceeding (e.g., a Chapter 13 proceeding). In one embodiment, case data from a bankruptcy information system can be pre-loaded to initiate a proof of claim generation and filing process. Also, unfiled proofs of claims can be identified using the bankruptcy evaluation system and case data can be pre-loaded to initiate the proof of claim filing process.

Although proof of claim filings are described herein in detail, embodiments of the invention allow for the batch filing of any suitable type of bankruptcy documents. The bankruptcy documents are in electronic form any may include proofs of claims and their associated supporting documentation. Proof of claim forms, in particular, are typically labeled as "Form B-10" in the United States Bankruptcy Courts.

Embodiments of the invention also allow creditors to create or edit proofs of claims using a Web interface. They may also query a database for the status of previously created proofs of claims. Embodiments of the invention can track all activity relating to the filing of a proof of claim, including any information generated by a court's computer system as resulting from the filing. Embodiments of the invention may also provide a database for the activity and information from which the creditor can use for ongoing tracking purposes. Reports can be provided to help creditors manage and administer proofs of claims.

Additionally, embodiments of the invention also allow creditors to: (1) generate and file a new proof of claim with back-up documentation (including generated and populating a B10 form in PDF for court filing), (2) receive court receipts for proofs of claims, which are successfully filed, (3) amend or withdraw previously filed proofs of claims, (4) upload proofs of claims and back-up documentation for future release, and (5) produce activity and summary reports for administration and tracking purposes.

To achieve these advantages or other advantages, a server computer at a data processing organization may receive requests from a plurality of creditors to file proofs of claims for debts owed by debtors to the creditors with a plurality of different bankruptcy organizations. Each request can include data records for generating a proof of claim. Then, proofs of claims are automatically generated and formatted for filing with different bankruptcy organizations. The proofs of claims are then batch filed with different bankruptcy organizations along with any backup documentation that would support the proofs of claims.

A data processing system according to an embodiment of the invention is shown in FIG. 1. FIG. 1 shows a member 12, a bankruptcy notification service 40, a data processing organization 20, and a court 30 in communication with each other via a communication medium 22. Although one member 12, bankruptcy notification service 40, data processing organization 20, and court 30 are shown for simplicity of illustration, it is understand that there may be additional members, bankruptcy notification services, data processing organizations, and courts in other embodiments within the scope of the invention. Each of these components is described in further detail below. In addition, a data processing system according to an embodiment of the invention may include fewer components than those shown in FIG. 1.

Member 12 may be a member bank in a banking association. In other embodiments, however, the member 12 need not be a bank that is part of a pre-defined banking association. In addition, the member 12 could alternatively be any suitable creditor and need not be a bank. For example, instead of a member, the member could be a creditor such as a retail store, sole proprietorship, government entity, etc. The member 12, or other creditor, may utilize at least one client computer 12(a) to send and receive information.

The bankruptcy notification service 40 may comprise any suitable organization that can notify creditors of bankruptcies that have been filed. Suitable bankruptcy notification services are provided by Visa®. Such bankruptcy notification services monitor bankruptcy courts for bankruptcy filings by debtors. Those debtors are then identified and creditors are notified of the bankruptcy filings so that the creditors may thereafter file proofs of claims.

As shown in FIG. 1, the data processing organization 20 may have at least one server computer 20(a), which may have a corresponding computer readable medium (CRM) 20(b) to store information or store code for performing the functions of the data processing organization 20. The data processing organization 20 may also have a database 20(c) that is operatively coupled to the server computer 20(a) for temporarily or permanently storing bankruptcy information.

The data processing organization 20 and/or its server computer 20(a) may perform various functions. Such functions include: a search function (where users may search, view, edit delete, amend, and withdraw individual proofs of claims, and add or delete backup documentation relating to such proofs); an add function (where users may add new proofs of claims and may add back documentation); a legacy proof of claim function (where users can amend, replace, or withdraw proofs of claims that they filed through other channels); a manage files function (which allows users to submit proofs of claims and backup documentation to batch files, and download batch related documentation based on date ranges); and a reports function (which allows users to download and view batch process and proof of claim filing reports).

The search function can provide a number of data fields for a user via a graphical user interface. The data fields may include case number, date of POC generated or date of POC filed, account number, debtor name, debtor social security number (SSN), POC identifier, filing action, secured claim amount, unsecured claim amount, priority claim amount, record status, collateral type, batch number, court number, and court state. The results of the search may include information such as: POC ID, case number, account number (last four digits), court, record status, debtor 1 and debtor 1's SSN, debtor 2 and debtor 2's SSN, and any claim amount(s).

The add function can allow a user to add a new POC record. The user may fill out appropriate data fields and may send this information to the host site.

The manage files function allows a user to upload new backup documentation or delete existing documentation for a non-filed POC or a new POC. The user sees the individual court's requirements on the graphical user interface. In a "manage batch files" function, users can download return files from batch processes and upload POCs and supporting documentation in a batch format.

The reporting function allows a user to download various reports including the following: daily status report, proof of claim validation report, documentation validation report, filing activity report, batch track report, aging report, and account tracking report.

Other data fields that can be provided to a user via a graphical user interface when filing a POC may include the following: unique identifier, chapter (e.g., 7, 11, etc.), hold expire date, release filing without backup documents, court number-city, case number, claim number, debtor account number, debtor name, debtor social security number, creditor, creditor address and phone number, notices, previously filed date, basis for claim (e.g., goods sold, services performed), date debt incurred, date court judgment obtained, includes interest charges, secured claim amount, collateral type, arrearages, unsecured non-priority claim amount, unsecured priority, signature, and installment loan.

As used herein, a "server computer" or "host computer" may be embodied by one or more computational apparatuses, which can service the requests of one or more client computers. Typically, a server computer or host computer is a powerful computer or cluster of computers that behave as a single computer. For example, the server computer 20(a) can be a mainframe computer, a minicomputer, or a minicomputer cluster. In another example, the server computer 20(a) may include one or more database servers and one or more Web servers. The server computer 20(a) may service the requests of one or more client computers.

The court 30 may be a bankruptcy court. Preferred embodiments of the invention can be used to file proofs of claims in any suitable type of bankruptcy proceeding. Such proceedings may include Chapter 7, Chapter 13, Chapter 11, etc. bankruptcy proceedings.

In FIG. 1, one court 30 is shown for simplicity of illustration. As explained above, in other data processing systems, there are many courts with many different filing requirements or interfaces. As shown in FIG. 1, the court 30 may have at least one host computer 30(a), which may operate a Web site (or host site) 30(b) to allow the public to file documents or access records.

The communication medium 22, which allows the various entities in FIG. 1 to communicate electronically, may including any suitable combination of communication lines, channels, and radio interfaces. According to one embodiment, the communication medium 22 may include, for example, the Internet, an intranet, the public switched telephone network (PSTN), or a wireless telephone or radio network. According to one embodiment, the server computer 20(a) and various client computers (e.g., client computer 12(a)) via the communication medium 22 using a TCP/IP based protocol. In one embodiment, the communication medium 22 could comprise a payment processing network such as a VisaNet™.

Figure 2:
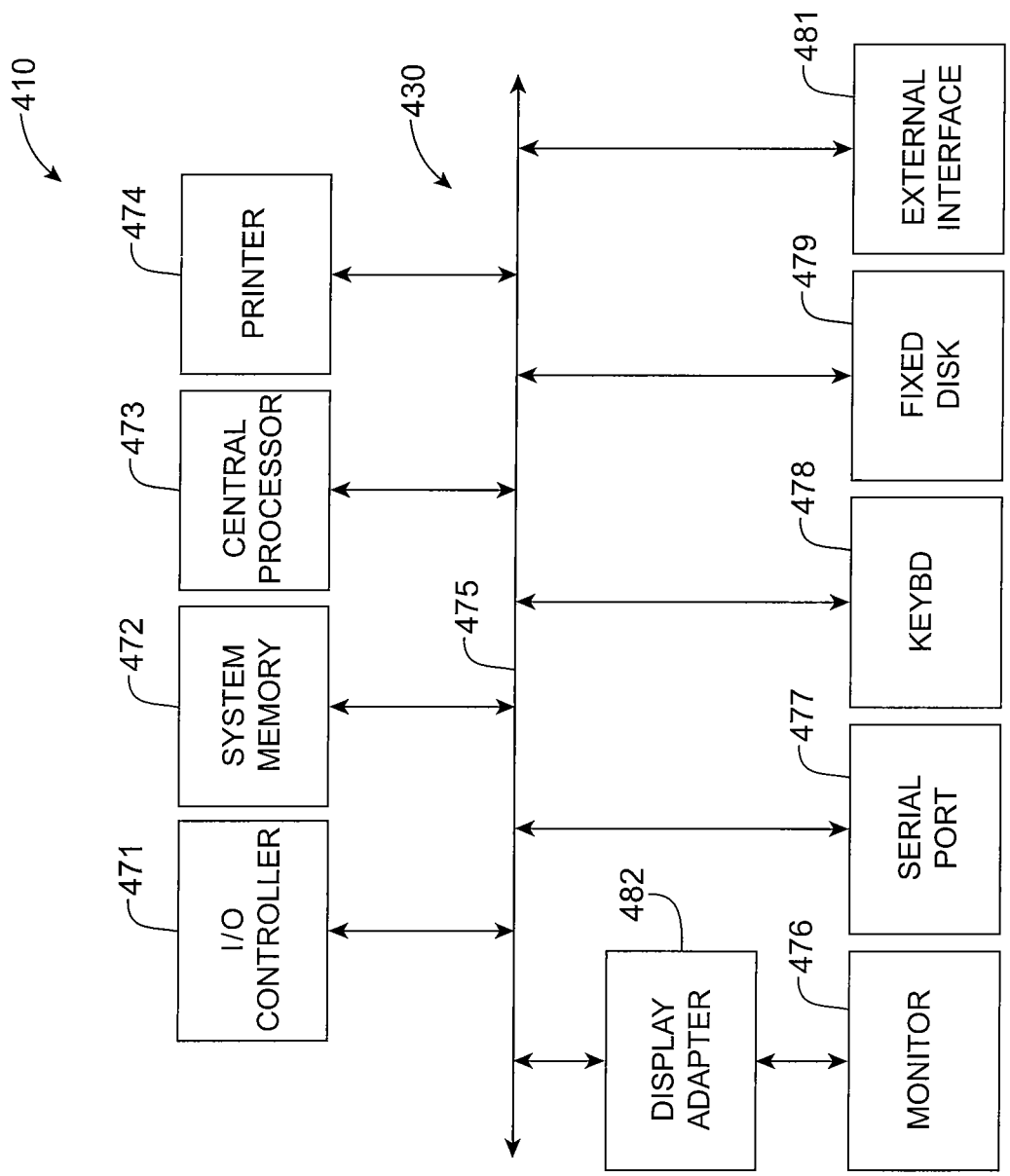
FIG. 2 is a block diagram showing components of a computer apparatus.

Any of the computations apparatuses (e.g., server computer 20(a), host computer 30(a), and client computer 12(a)) may utilize any suitable number of subsystems. Examples of such subsystems or components are shown in FIG. 2. The subsystems shown in FIG. 2 are interconnected via a system bus 475. Additional subsystems such as a printer 474, keyboard 478, fixed disk 479, monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 or external interface 481 can be used to connect the computer apparatus to a wide area network such as the Internet, a mouse input device, or a scanner. The interconnection via system bus allows the central processor 473 to communicate with each subsystem and to control the execution of instructions from system memory 472 or the fixed disk 479, as well as the exchange of information between subsystems. The system memory 472 and/or the fixed disk 479 may embody a computer readable medium.

Referring again to FIG. 1, a method for generating and filing proofs of claims can be described.

First, a debtor (not shown) may file for bankruptcy with the court 30. After the debtor files for bankruptcy, the bankruptcy notification service 40 electronically or manually contacts the bankruptcy court 30 to determine if the debtor has filed for bankruptcy (step 18(a)-1). For example, the bankruptcy notification service 40 may contact the court's client computer 30(a) via the communication medium 22, or may have an employee contact the court 30 by phone or in person. After contacting the bankruptcy court 30, the bankruptcy notification service 40 receives information verifying the debtor has filed for bankruptcy (i.e., a bankruptcy notice) (step 18(a)-2). The information may be sent to the bankruptcy notification service 40 electronically or through a paper delivery service (e.g., the U.S. mail).

After the bankruptcy notification service 40 receives the bankruptcy notice, the bankruptcy notification service 40 sends the bankruptcy notice to the member 12. This can be done using a paper delivery service (e.g., the U.S. mail service) (step 18(b)-1) or electronically through the communication medium 22 (step 18(b)-2).

After the member 12 receives a bankruptcy notice from the bankruptcy notification service 40, the member 12 processes the bankruptcy notice. The member 12 determines whether or not it wants to file a proof of claim against the debtor in the court 30. In some cases, the member 12 may decide that the value of any potential claim that is filed in the bankruptcy proceeding would not exceed the fees for processing the claim, so the member 12 may decide that filing a proof of claim would not be cost effective. On the other hand, the member may decide that it is cost effective to file the proof of claim.

If the member 12 decides to file a proof of claim against the debtor, the member 12 can send POC (proof of claim) input records and supporting documentation to the data processing organization 20. The POC input records and the documentation files may be sent to the data processing organization 20 electronically via the communication medium 22 using the member's client computer 12(a) (steps 18(c) and 18(d)), and this information may be received by the server computer 20(a).

After the server computer 20(a) receives the POC input records and supporting documentation, the server computer 20(a) processes the information and generates appropriate proofs of claims for the court 30. The server computer 20(a) also formats other proofs of claims for other courts. These other proofs of claims may have originated from a request by the member 12, or other creditor. Supporting documentation is also associated with (e.g., attached to) the various proofs of claims that are generated. The proofs of claims are then "batched" together for filing at period time intervals.

After the proofs of claims and their supporting documentation are prepared and ready to be filed, they may be sent to the host computer 30(a) at the court 30 via the communication medium 22 (steps 18(e) and 18(f)). If they are correctly prepared, the proofs of claims and their supporting documentation are thereafter filed with the court 30.

In embodiments of the invention, the proofs of claims may be filed in a "batch" mode. A batch mode filing process may include the simultaneous or near simultaneous filing of proofs of claims with the same or different courts, wherein the courts have the same or different filing procedures and/or filing formats. In embodiments of the invention, proof of claim filing requests may be received from various creditors and the POC filings may be generated by the server computer 20(a). Once generated, the POC filings may be batched together so that they are submitted to various courts in batches at predetermined times. The predetermined times may include once a day, twice a day, every hour, every half hour, etc. The server computer 20(a) can determine which proofs of claims are ready and complete with backup information, valid data, etc., and they are filed with the various courts according to their specific requirements. The batches of proofs of claims may be batched according to time of filing, as described above. They may alternatively or additionally be batched by court.

After the proofs of claims are filed with the court 30, the court 30 may send a filing receipt back to the data processing organization 20 (steps 18(g) and 18(h)). If the proof of claim filing and other filings in the batch were not successful, the data processing organization 20 can follow up to track any problems that may have occurred in the POC filings.

After the server computer 20(a) operated by the data processing organization 20 receives confirmation that the POC filing was successful, the server computer 20(a) may generate filing reports and other documents (e.g., PDF reports or POC transaction return files which may be .txt files). The server computer 20(a) can then send any filing reports back to the client computer 12(a) operated by member 12 (steps 18(i), 18(j)).

Figure 3:
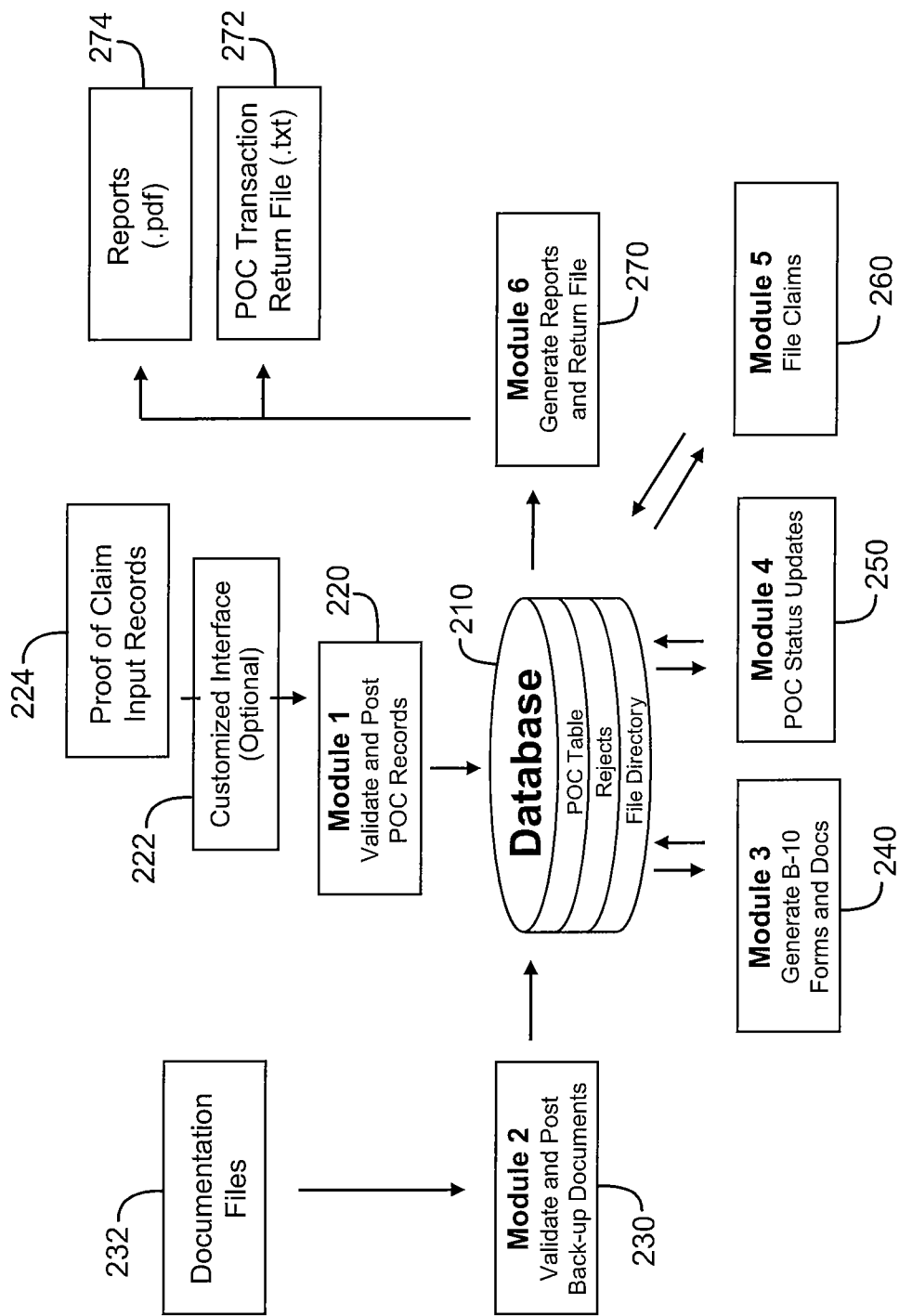
FIG. 3 is a block diagram showing processing modules that can be used in embodiments of the invention.

FIG. 3 shows block diagram of various software modules and components that can be used in the systems and methods according to embodiments of the invention. The components include proof of claim input records 224 (for generating proofs of claims), an optional customized interface 222, and supporting documentation files 232. Reports 274 and POC Transaction Return Files 272 are also shown.

The software modules that are shown include a validate and post POC records module 220, a validate and post backup documents module 230, a generate B-10 forms and docs module 240, a POC status updates modules 250, a file claims module 260, and a generate reports module 270. Each of these modules interacts with a database 210 including a POC table, rejects (information about rejected filings), and a file directory. The various modules may be embodied by computer code stored on a computer readable medium.

Figure 4:
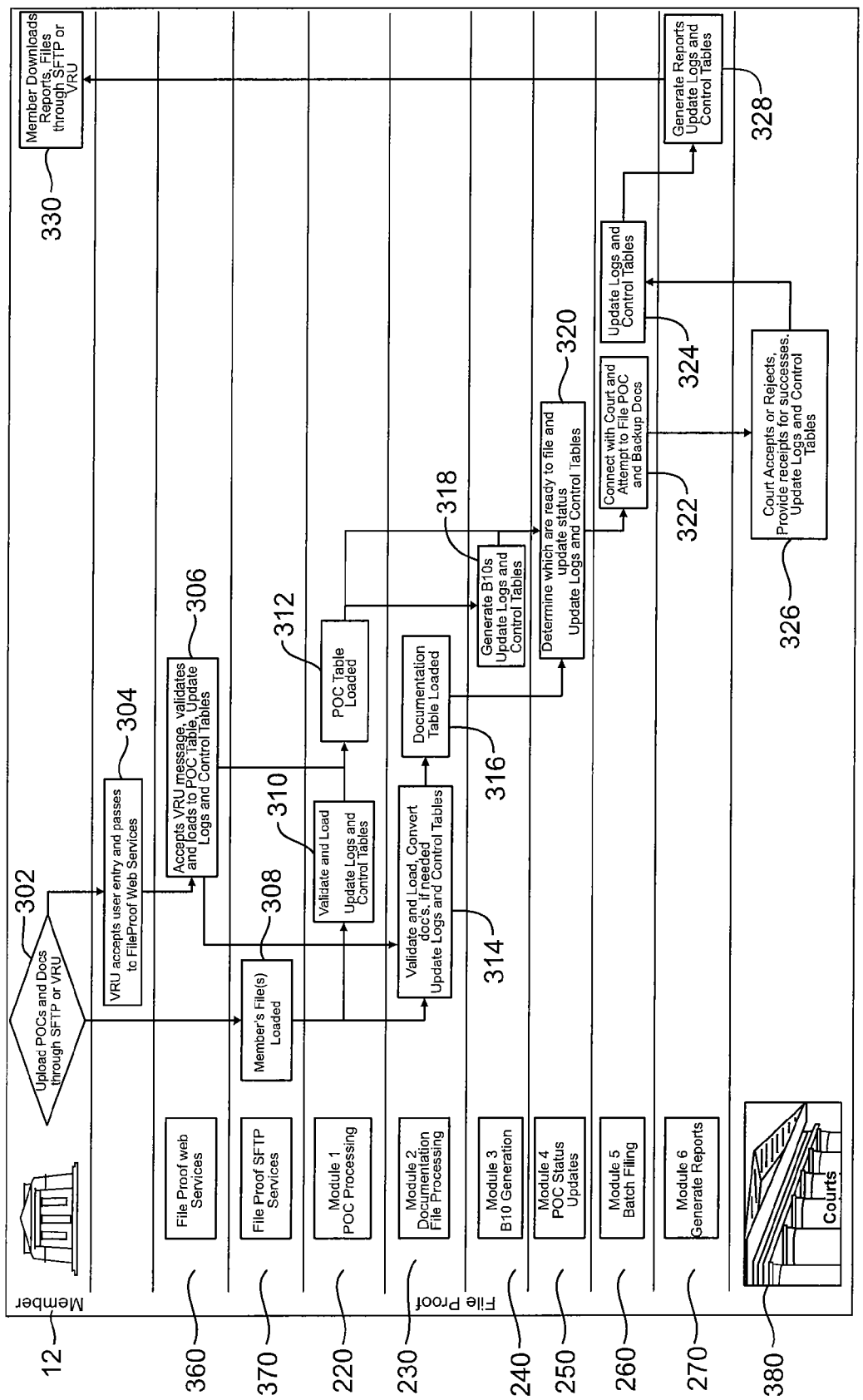
FIG. 4 is a flowchart illustrating how the processing modules in FIG. 3 can process bankruptcy claim information.

The interaction of the various software modules and components shown in FIG. 3 can be described with respect to the flowchart shown in FIG. 4. At steps 302, 304, and 308, a member 12 or other creditor uploads data records for POCs and supporting documents to an SFTP (secure file transfer protocol) server 370 or to a Web services server 360. Other methods could also be used.

If an SFTP server 370 is used, the member files are loaded into the SFTP server 370 (step 308). The POC processing module 220 then validates the received information and loads information into one or more POC Tables (steps 310, 312).

Before or after POC processing module 220 performs its function, the document file processing module 230 then validates and loads supporting documentation, and updates and logs control tables (step 314). Then, one or more documentation tables are loaded (step 316).

If a Web interface is used, a Website may accept user entry and they may pass the request onto a Web interface (step 304). The Web interface accepts the message from the member 12, and then validates and loads received information to a POC table (step 306). Logs and control tables are also updated.

One or more POC tables are loaded (step 312) using the POC processing module 220, and the documentation file processing module 230 validates and loads supporting documentation (steps 314, 316). Documentation is converted, if needed, and logs and control tables are updated.

Regardless of whether or not an SFTP server or Web server are used, the B10 generation module 240 generates B10 forms for various different courts with different filing requirements and updates logs and control tables (step 318). After the B10 forms are generated and after any supporting documentation is ready to be sent to the bankruptcy courts, the POC status updates module 250 determines which are proofs of claims are ready to file (step 320). Logs and control tables are also updated.

Then, the batch filing module 260 connects with the court and attempts to file the POCs with backup documentation in a batch mode (step 322). The court 30 then either accepts or rejects the filed POCs, and then provides receipts for successful filings (step 326). The batch filing module 250 then receives the court's responses and then updates logs and control tables (step 324). The generate reports modules 270 then generates reports, and also updates logs and control tables (step 328). The member 12, can thereafter download files and reports through the Web interface or through an SFTP or other type of connection (step 330). Alternatively, reports can be sent to the member 12 via e-mail.

A number of different filing reports may be provided to the users (e.g., creditors such as members, etc.) of embodiments of the invention. For instance, embodiments of the invention can provide users with at least seven types of reports to assist in the management of their filed proofs of claims. These reports are useful and may be output in a tangible format such as via a display or on a piece of paper by a printer or the like.

| Report | Description |
| --- | --- |
| Daily Summary Report | This shows a summary of statistics of all processing which occurred. It provides a breakdown of received, processed, and rejected files, POC records, and back-up documents. |
| Proof of Claim Validation Report | This shows a summary of statistics of received/accepted/rejected status. It also shows detail, by claim, of rejected claims with reason for rejection. |
| Documentation Validation Report | This shows summary statistics of received/accepted/rejected status for documentation. It also shows detail, by document, of rejected documents with reason for rejection. |
| Filing Activity Report | This report contains three sections. It includes a "Summary," which summarizes statistics of all processing which occurred, "Filing Detail," which provides detail, by claim, of claims that were filed, including which documents were submitted, and "Claims Unable to File" which includes detail, by claim, of claims the server computer was unable to file, with reason and suggested resolution. |
| Batch Track Report | This is a summary report breaking out summary statistics for each batch. |
| Aging Report | This shows a detailed report of the status of unfiled claims. |
| Account Tracking Report | This shows detailed activity for all claims within the time period (e.g., in a month). |

To further illustrate embodiments of the invention, screenshots, reports, and data fields are shown in FIGS. 5-18. As illustrated in these Figures, embodiments of the invention allow a member or other creditor to easily monitor the status of any proof of claim filings that it has requested. This is particularly useful when a creditor needs to file many proofs of claims and monitor their status.

FIG. 5 shows a proof of claim input record (.txt file), which has information that a member or other creditor may provide to the data processing organization so that the data processing organization can generate and file proofs of claims. As shown in FIG. 5, the input record may include a number of data fields. The "unique identifier" field contains an identifier which keeps the particular record unique. It allows the server computer to match the POC record with its corresponding back-up documentation. It identifies the system user, member, claim status, and sequence number. As shown, there are indicia to represent the user, the member, the status of the claim (e.g., filed, amended, or withdrawn), and the sequence. The sequence may be the number of times that the proof of claim has been submitted. For example, if it has been rejected by a bankruptcy court once, then the sequence number may be "1".

In FIG. 5, the "transaction type" field indicates what the member wants to do with the record. For example, a member may want to add a file, delete a file, hold a file, but not release it, and release a previously held file. "Filing action" indicates what was done with the court. For example, a record may be filed, amended, or withdrawn. "Court number" indicates the court where the claim will be filed. "B-10 Fields" includes the case number, the claim amount, etc. This includes data needed to generate a B-10 form. "Automatically generate B-10" form indicates whether the server computer or the member will generate the B-10 form. "Automatically Generate Back-up Document" indicates whether the system or member will generate unsecured back-up documentation. "Hold Expire Date" indicates the date upon which a hold flag will expire. "Release Filing Without Back-up Documents" indicates that the system will release the claim filing without back-up documentation, or that the system will release claim filing after back-up documentation has arrived. "Back-up Document Fields" indicates fields that are needed to automatically generate unsecured backup documentation.

FIG. 6 shows a Daily Summary Report. It shows the number of proof of claim records and documentation files received from the user, and the number of records accepted and rejected. It also shows the status of the proofs of claims filed at the bankruptcy courts.

FIG. 7 shows a proof of claim validation report. FIG. 7 shows that one record was rejected and the reject detail for that rejected POC filing is provided. In this particular example, the rejected claim had an invalid court number and $0 for a claim amount.

FIG. 8 shows a documentation validation report. This provides a report on the status of the filing of the documentation supporting the proof of claim filings. As in FIG. 7, the reasons for the rejections are provided.

FIG. 9 shows a filing activity report. As shown therein, the proofs of claims that are ready to file are listed. It shows the unique IDs of the claims, the district court, the case number, the number of claims, and amounts, the filing dates and times, the case stamp, the document submitted, the document stamp, and the batch number.

FIG. 10 shows data fields for return files, after proofs of claims have been filed. The data fields include a unique identifier, a filing status, a date and time that the claim was filed, a court ID stamp, the name of the district court in which the claim was filed, the case number, the claim number, the debt type, the claim amount, and the account number on the claim.

FIG. 11 shows a screenshot of an aging report. As shown, the statuses of the POCs to be filed are shown. One POC has a status of "waiting" as the server computer is waiting for back-up documentation to submit with the POC. Another POC has a status of "hold" whereby a member may have requested that the filing be held upon further notice. The last POC has a status of "ready" to file.

FIG. 12 is a batch track report. As shown in FIG. 12, one batch of POCs per day was filed, and the status of each of those batch filings is shown. Included in the report are the number of POCs submitted, filed, amended, withdrawn, deleted, and pending.

FIG. 13 is a search POC form. As shown, a user can enter specific information into the various data entry boxes in the form and can search for POCs. FIG. 14 shows the results of the search using the search form shown in FIG. 13. As shown, a number of POCs and their statuses are shown.

FIGS. 15A-15C show a form that can be on a Web site that can be run by the data processing organization. The form can be used for filling in an individual POC. This form might be used if a single POC is to be submitted through the Web site operated by a data processing organization. FIGS. 15A-15C show that the server computer operated by the data processing organization may create and file an individual proof of claim using the form shown in FIGS. 15A-15C, or it may create and file a batch of proofs of claims as described above.

FIG. 16 is a screen that will allow one to upload backup documentation to the server computer operated by the data processing organization to attach to POCs. As shown, documentation such as promissory notes and contracts may be attached to the POCs.

FIG. 17 shows a file management screenshot. The screen shown in FIG. 17 may be used to upload batches of POC files and batches of documentation files associated with the POC files to the server computer operated by the data processing organization. A region for entering requests to download information from the server computer.

FIG. 18 shows a screen that will allow one to download reports. As shown, various reports that gather filing information from various date ranges may be downloaded.

As noted above, embodiments of the invention have a number of advantages. For example, using embodiments of the invention, a creditor such as a bank may interact with a single entity (e.g., a data processing organization) to file all of its proofs of claims (or other bankruptcy documents) with various bankruptcy courts around the country. The bank need not take the time and effort to figure out the filing requirements of each and every bankruptcy court. In addition, as shown above, embodiments of the invention allow creditors to easily track the status of many proof of claim filings. This helps creditors with large numbers of claims keep track of their claims.

As noted above, although the filing of POCs is discussed in detail, the principles outlined above can be applied to any suitable filings in bankruptcy courts.

II. Document Interaction Processes

The embodiments of the invention that are described above can be used to interact with almost 100 independently configured bankruptcy court Case Management/Electronic Case Filing (CM/ECF) systems. Each bankruptcy court's filing system is based on the same CM/ECF system, but each court may choose to configure its own system to its own requirements and needs. Also, different courts may be on different versions of the system. The courts may also choose to update their systems at different times, with or without notification of its users. Also, the data processing system that is described above preferably operates continuously and would preferably not have to stop or become interrupted, because one or more courts decide to change the configurations of their filing systems.

One way to automate the filing process, despite the different requirements, is to develop specific computer programs for the 100 or so bankruptcy courts. This is undesirable, since this is a time consuming and complex task. Even if this could be done, courts modify their filing systems on occasion, and each of the computer programs would need to be constantly updated.

Although each court has different filing configurations, the same basic electronic filing system is used as the foundation for the vast majority of bankruptcy courts. Consequently, different code versions can be developed for the different functions in the filing systems. These different code versions can account for the functions that the different courts might impart to their individual systems. An example of a "function" may be a "search creditor" function, and there may be different "code versions" that are prepared for the different bankruptcy courts. For instance, code version A may automate the "search creditor" function for a bankruptcy court in California, while code version B may automate the "search creditor" function for a bankruptcy court in Florida. Using selected groupings of code versions for different functions, embodiments of the invention can log into any court's computer filing system and determine the system's document (e.g., Web page) layout, components, and properties. Once it determines the court system's layout, components, and properties, it then selects which code version to use for each function it needs to perform and executes the code in the grouping of code versions that is selected.

Although the different code versions need to be developed at some point in time, they can be re-used with the filing systems of different courts, and can be put together in modular manner to form a customized grouping of code versions that can automate the filing process for virtually any bankruptcy court, without having to create a specialized program from scratch for each bankruptcy court. These additional embodiments of the invention can intelligently interact with each court's filing system.

Embodiments of the invention have a number of advantages. First, if the court makes changes to its system, the system will most likely still be able to perform the necessary functions since the changes will most likely already be in the code version library from other courts. Second, programming time is minimized since code is reused. Embodiments of the invention can use pre-existing code versions in libraries in order to reuse existing code. Third, embodiments of the invention eliminate the need to manually track each court's filing configurations, since embodiments of the invention will be able to react accordingly to different configurations created over time by the various courts.

In one embodiment of the invention, a document object model is created. The document object model models document objects on a document. As used herein, "document objects" include any elements on an electronic document such as a Web page that may correspond to a particular function. For example, a fill in box for a creditor and a corresponding "submit" button may form a document object associated with the function "search creditor." The document object model basically "models" the document objects on the document by determining characteristics such as any text, input elements, and data entry fields that may be associated with the document objects, and their locations on the document.

After creating the document object model, it is reviewed. Then, a digital computer, such as the server computer 20(*a*) in FIG. 1, may select a code version from a library of code versions, wherein the selected code version is specifically associated with at least one document object on the document. For example, there may be a first code version in a first library of code versions. The first code version may be specifically associated with a first document object on the document. There may be a second code version from a second library of code versions. The second code version may be specifically associated with a second document object on the document. The first code version and the second code version are included in a customized group of code versions, wherein the customized group of code versions is used to cause a digital computer to automatically interact with the document. For example, the code in the customized group of code versions may cause a microprocessor in the digital computer to cause populate the document with the correct bankruptcy data, and then submit the populated document to the appropriate bankruptcy court.

Although these document interaction embodiments are described in the context of bankruptcy court filings, these interaction embodiments may be used in other environments. For example, embodiments of the invention may be used for filing court documents in other types of civil or even criminal courts. In addition, embodiments of the invention could also be used to automatically interact with any suitable documents operated by any suitable number of entities.

Figure 19:
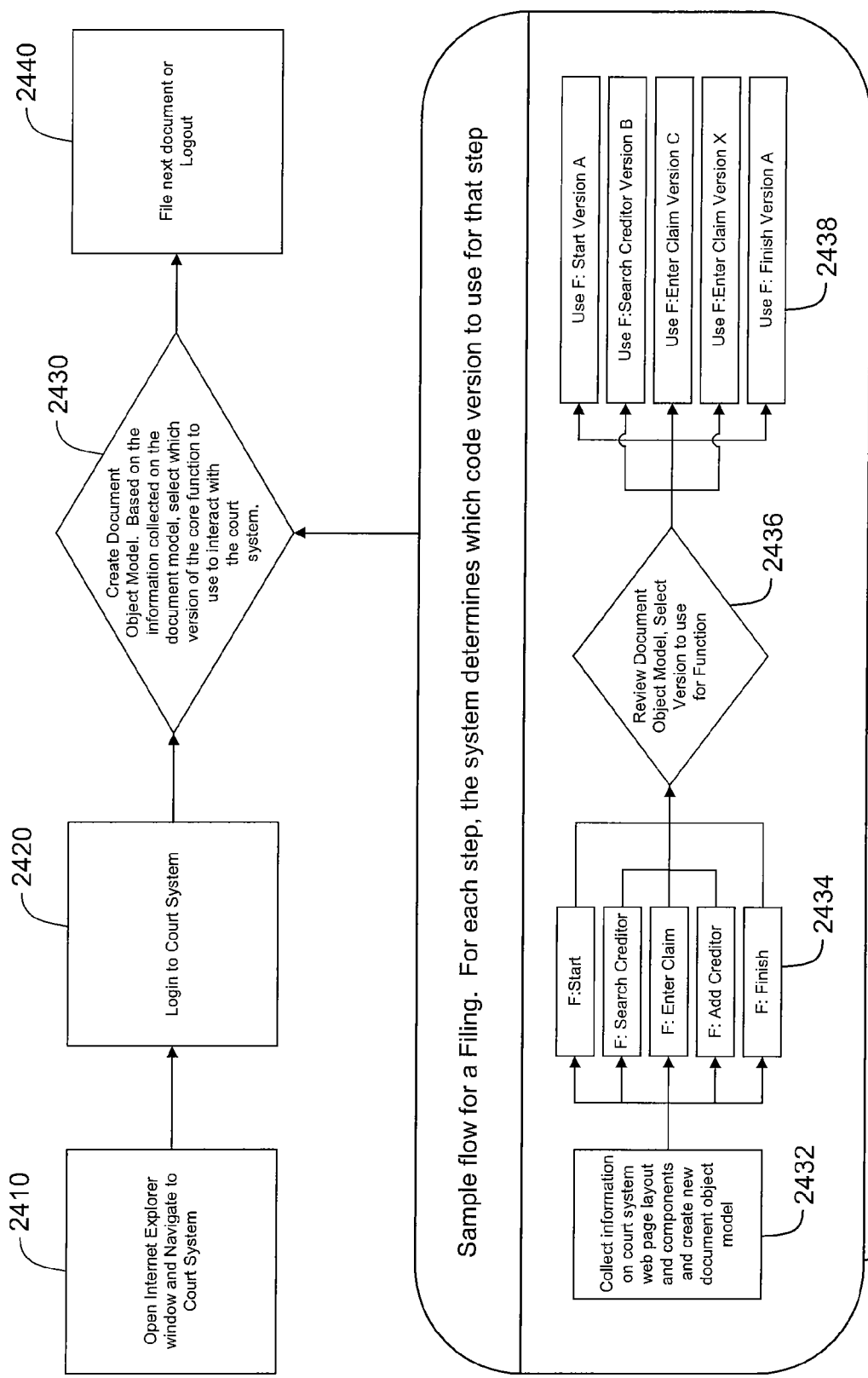
FIG. 19 is a flowchart which illustrates steps that can be used in a document interaction process.

FIG. 19 shows a flowchart illustrating how a document interaction embodiment of the invention can be performed. Referring to FIG. 1 and FIG. 19, the server computer 20(*a*) shown in FIG. 1 may open a Web browser, and navigate to the court's Web site 30(*b*) (step 2410) (as if a human was performing this function). The server computer 20(*a*) then logs into the court's Web site 30(*b*) (step 2420). A Web page (i.e., an electronic "document") may then be presented. (For simplicity of illustration, a single Web page is discussed. It is understood the described process can be repeated for any number of Web pages.)

The server computer 20(*a*) then creates a document object model (step 2430) by identifying the functions on the Web page and selecting code versions from libraries of code versions that correspond to those functions. This process is described in further detail below. Based on the information collected on the document object model, the correct code versions are selected by the server computer 20(*a*), and the selected code versions are used by the server computer 20(*a*) to interact with the Web page. A customized grouping of code versions is created for the Web page and/or the Web site 30(*a*), and the code in this customized group of code versions can be used to automatically fill in the Web page and then activate it (e.g., automatically selecting a submit button), thereby automating the proof of claim filing process. The next document is then filed or the user logs off (step 2440).

The exemplary creation of the document object model and the selection of code versions is shown in box 2000 in FIG. 19. As shown in box 2000, in the creation of the document object model, document objects on a court's Web page are collected and a document object model is created (step 2432). For example, blocks 2434 illustrate exemplary document objects associated with the following functions that are associated with filing a proof of claim: "start", "search creditor", "enter claim", "add creditor" and "finish".

The server computer 20(*a*) may identify particular properties associated with each of the document objects. For example, it may identify the document object associated with the function "search creditor." This particular document object may have a number of data entry boxes whereby a user may enter the name or other information that would identify a creditor, and may have a "search" button which the user may select after the user enters information into the data entry boxes. The location of the search button on the court's Web page, and the format and locations of the data entry boxes associated with the "search creditor" function may be determined by the server computer 20(*a*). This process may be repeated for all or less than all of the document objects on the Web page, or on the Web site 30(*b*).

After the server computer 20(*a*) creates the document object model, the server computer 20(*a*) reviews the document object model and then selects the appropriate code versions to use with each document object (step 2436). Each function and/or document object may have a library of code versions associated with it, and one code version from each library is selected to form a customized grouping of code versions for that Web page (or Web site 30(*a*)). For example, as shown by reference number 2438 in FIG. 19, the document object associated with the "start" function may use code version A from a first library of code versions, the document object associated with the "search creditor" function may use code version B from a second library of code versions, the "enter claim" function may use code version C from a third library of code versions, the "enter claim" function may use code version X from a fourth library of code versions, and the "finish" function may use code version A from a fifth library of code versions. The selected code versions A, B, C, X, and A may form a customized grouping of code versions that can automate the filing process for the particular bankruptcy court 30.

As illustrated above, selected code versions may be characterized as a customized code grouping that is suitable for interacting with that Web page. This customized code grouping may be formed automatically by a digital computer such as the server computer 20(*a*).

In a specific illustration of the above-described method, from within a programming environment such as Microsoft's Visual Studio.NET, embodiments of the invention can create a new iexplore.exe process and open a connection using shdocvw.dll (shdocvw.dll is a library used by Windows applications to add basic file and networking operations, and is encapsulated in .NET InternetExplorer object). Then, embodiments of invention interact with the IE object by issuing commands (e.g., navigate to URL, quit browser window, etc.), receiving events (e.g., browser window ready—new page loaded), and getting properties (document object model document). A new document object model (DOM) is created using mshtml.dll (a module containing HTML-related utility functions and which is encapsulated in a .NET HTMLDocument object). Embodiments of the invention then assign an InternetExplorer.Document property to the HTMLDocument object, and then interact with the HTMLDocument object. Embodiments of the invention then receive data (e.g., rendered HTML, rendered text), get properties (individual document object model elements), and issue commands (e.g., fill in text box, click button, click anchor, select option element, etc.).

On the court's Web site, the court Web page navigation process can be broken down into discrete steps or core functions. They include a) Login, b) Logout, c) Upload documents, d) File proof of claim (F:Start; F:Search Creditor; F:Add Creditor; F:Enter Claim; and F:Finish), and e) File withdrawal (W) (W:Start; W:Search Case; W:Select Party; W:Add Party; W:Claim Action; W:Attorney; W:Claim Amount/Number; W:Claim Party; W:Claim Status; W:Confirm; and W:Finish).

Each core function contains of a grouping of verifications, commands, and results. For example, "Login" will do the following: verify that the current page contains required keywords; locate and fill the "Username" text box; locate and fill the "Password" text box; locate and click the "Login" button; wait for new page to load; and verify current page contains required keywords to validate login success. Checks are also made for alternate keywords (i.e. "invalid username", "user already logged in", etc).

As explained above, each core function may be associated with or contain multiple code versions, so that compatibility is maintained as changes to court websites are made. As explained above, document objects on Web pages can differ from court to court. For example, as shown in FIG. 20, the function "F:Add Creditor" can work differently for two different courts. As shown in FIG. 20, in Version A: Address 1, Address 2, City, State, Zip are discrete text boxes and may be associated with a bankruptcy court in California. Version B may be associated with a bankruptcy court in Maryland. In Version B, the address is one multi-line text box, and the entire address is entered at once. When the "F:Add Creditor" function is run, the first thing that the digital computer does is locate the address text boxes on the Web page. If it finds discrete address fields, it uses "Version A" logic; if it finds one multi-line field, it uses "Version B" logic. When courts upgrade their sites and change from "Version A" to "Version B", the change will be detected and compensated for automatically.

Page elements that are the same in appearance may have different properties from court to court. Buttons, text boxes, lists, etc that serve the same purpose from court to court can have different names or captions. Code versions are created for the core functions to account for these differences. For example, "F:Search Creditor" needs to identify an existing select list on the page. This select list will contain the names of all the existing creditors on a case. The select list is present on each court's "Search Creditor" page, but the actual element name will differ. Some courts call it [1st_searchCreditor], others [1st_Creditor]. There are two possible versions of this list.

If [1st_searchCreditor] is found, it is utilized and the function continues. If it is not found, [1st_Creditor] is searched for; if found, it is utilized and the function continues. If neither is found, an error is shown. Possible error outcomes are: 1) that the page didn't load successfully, 2) it is the wrong page, or 3) a new list name variation has occurred, and a new version needs to be added to the function.

Lastly, not all courts use all core functions. The functions may appear more than once, or out of order on different court sites. All of the core functions are compiled into a single super-class, and specific sub-classes are created for each court, with customized "File" and "Withdraw" functions. For example, the Court "Alabama South" calls the following core functions from within its "Withdraw" function:
    W:Start
    W:Search Case
    W:Claim Action
    W:Confirm
    W:Attorneys
    W:Select Party
    (if not found) W:Add Party
    Upload Documents
    W: Claim Amount
    W:Finish Court "Arizona" calls the following core functions from within its "Withdraw" function:
    W:Start
    W:Search Case
    W:Claim Action
    W:Select Party (if not found) W:Add Party
Upload Documents
W:Confirm
W:Confirm
W:Claim Number
W:Confirm
W:Finish The sequence of core functions and/or the sequence of Web pages may be predetermined by the data processing organization, so that the server computer 20(a) knows what Web order pages to expect when filing POCs. However, the above-described process is used to automatically interact with each of the Web pages, even through they are configured differently or recently reconfigured. As new court functionality is added to each Web page, new core functions are created, and called from the court subclasses. If existing court functionality is modified, a new version of instructions may be added to the corresponding core function.

The document interaction embodiments described above have a number of advantages. First embodiments of the invention can be used to automatically file proofs of claims or other documents with bankruptcy courts or the like.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

This application is also related to U.S. patent application Ser. No. 11/613,889 entitled "Method and System For Document Interaction"), which is being filed on the same day as the present application, and which is herein incorporated by reference in its entirety for all purposes.

All patents, patent applications, publications, and descriptions mentioned above are herein incorporated by reference in their entirety for all purposes. None is admitted to be prior art.

What is claimed is:

1. A method comprising:
receiving requests from a plurality of creditors to file proofs of claims for debts owed by debtors to the creditors with a plurality of different bankruptcy organizations, wherein each request includes a data record for generating a proof of claim;
automatically generating the proofs of claims with the received data records, wherein the proofs of claims are suitable for filing with different bankruptcy organizations; and
batch filing the proofs of claims with the different bankruptcy organizations, wherein batch filing is performed by a server computer.

2. The method of claim 1 wherein the different bankruptcy organizations are different bankruptcy courts having different filing system configurations.

3. The method of claim 1 further comprising sending bankruptcy notification messages to the plurality of creditors, wherein the bankruptcy notification messages notify the creditors that different debtors have filed for bankruptcy.

4. The method of claim 1 wherein receiving requests from the plurality of creditors comprises receiving the requests using a secure file transfer protocol.

5. The method of claim 1 wherein receiving requests comprises receiving requests via a Web site.

6. The method of claim 1 where batch filing comprises aggregating the proofs of claims and filing the proofs of claims in a batch mode at least once per day.

7. The method of claim 1 further comprising:
generating a report; and
sending the report to a particular creditor.

8. The method of claim 7 wherein generating the report comprises generating an aging report specifying a reason some proofs of claims have not been filed.

9. The method of claim 7 further comprising receiving a filing receipt for a filed proof of claim.

10. The method of claim 1 further comprising: receiving, at the server computer, confirmation that the filings of the proof of claims are successful.

11. The method of claim 10 further comprising: sending, by the server computer and to a client computer, filing reports.

12. The method of claim 1 wherein the proofs of claims each include a debtor name, a debtor social security number, a claim number, and a court number.

13. The method of claim 1 wherein batch filing the proofs of claims with the different bankruptcy organizations occurs twice a day.

* * * * *